United States Patent [19]

Halpern

[11] Patent Number: 5,533,361
[45] Date of Patent: Jul. 9, 1996

[54] INSULATED GROCERY CART COOLER

[76] Inventor: Samuel J. Halpern, 19 Sylvan Way, Short Hills, N.J. 07078

[21] Appl. No.: 361,742

[22] Filed: Dec. 22, 1994

[51] Int. Cl.[6] .............................. B65D 23/08; F25D 3/08
[52] U.S. Cl. ............................................. 62/457.2; 62/371
[58] Field of Search .................................. 62/371, 457.1, 62/457.2, 457.7, 529, 530

[56] References Cited

U.S. PATENT DOCUMENTS

| | | | |
|---|---|---|---|
| 2,723,535 | 11/1955 | Jones | 62/457.7 |
| 2,730,151 | 1/1956 | Smith | 62/457.1 |
| 4,375,828 | 3/1983 | Biddison | 62/371 X |
| 4,514,993 | 5/1985 | Johnson | 62/372 |
| 5,361,603 | 11/1994 | Merritt-Munson | 62/457.2 |
| 5,406,816 | 4/1995 | Thomas | 62/457.1 |

*Primary Examiner*—Henry A. Bennett
*Assistant Examiner*—William C. Doerrler

[57] ABSTRACT

A cooler for retaining food items in a refrigerated condition within a grocery cart. The inventive device includes an insulated container positionable within the upper basket of a grocery cart. A mounting assembly coupled to the container secures the container to both the handlebar of the grocery cart and a portion of the upper basket thereof. Freezable gel packs are positioned within the container and cooperate to retain foods positioned therein in a refrigerated condition.

5 Claims, 3 Drawing Sheets

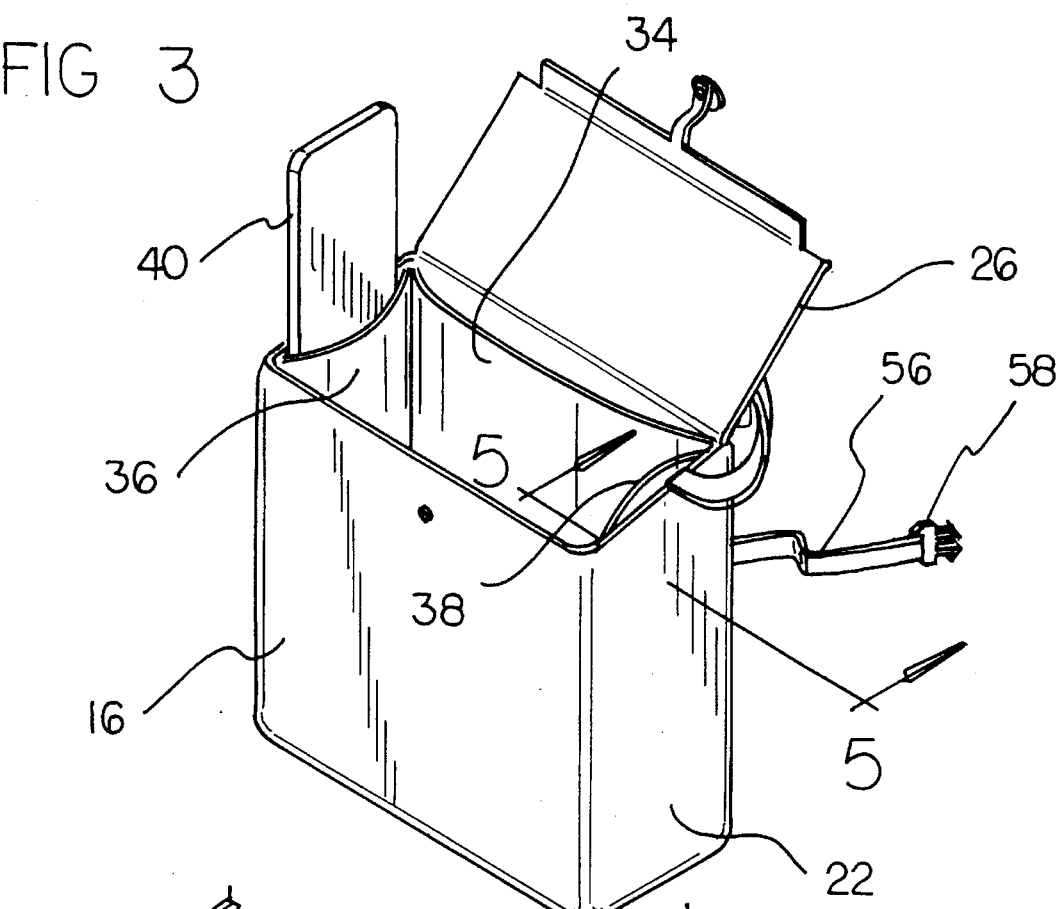
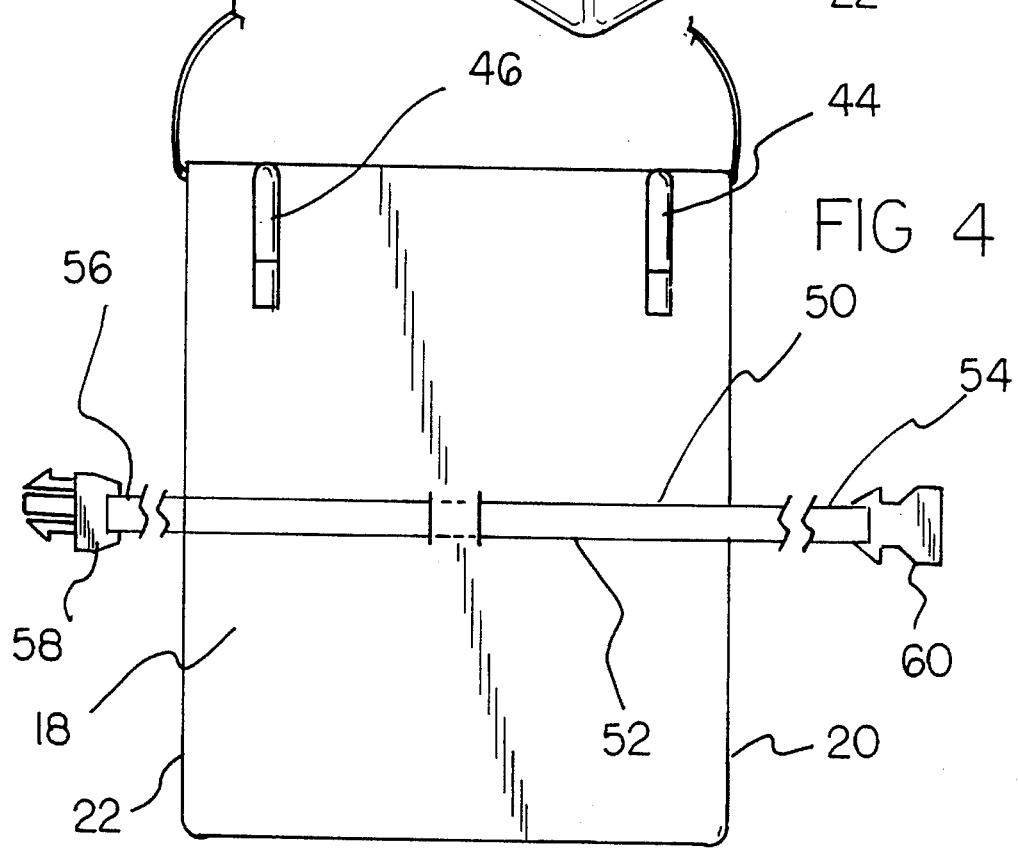

INSULATED GROCERY CART COOLER

BACKGROUND OF THE INVENTION

1. Field of the Invention

The present invention relates to storage devices and more particularly pertains to an insulated grocery cart cooler for retaining food items in a refrigerated condition within a grocery cart.

2. Description of the Prior Art

The use of storage devices is known in the prior art. More specifically, storage devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art storage devices include U.S. Pat. No. 4,826,060; U.S. No. Des. 261,213; U.S. Des. No. 315,477 and U.S. No. Des. 341,026.

While these devices fulfill their respective, particular objectives and requirements, the aforementioned patents do not disclose an insulated grocery cart cooler for retaining food items in a refrigerated condition within a grocery cart which includes an insulated container positionable within the upper basket of a grocery cart, a mounting assembly coupled to the container for securing the container to both the handlebar of the grocery cart and a portion of the upper basket thereof, and freezable gel packs positioned within the container which cooperate to retain the foods positioned therein in a refrigerated condition.

In these respects, the insulated grocery cart cooler according to the present invention substantially departs from the conventional concepts and designs of the prior art, and in so doing provides an apparatus primarily developed for the purpose of retaining food items in a refrigerated condition within a grocery cart.

SUMMARY OF THE INVENTION

In view of the foregoing disadvantages inherent in the known types of storage devices now present in the prior art, the present invention provides a new insulated grocery cart cooler construction wherein the same can be utilized for retaining food items in a refrigerated condition. As such, the general purpose of the present invention, which will be described subsequently in greater detail, is to provide a new insulated grocery cart cooler apparatus and method which has many of the advantages of the storage devices mentioned heretofore and many novel features that result in a insulated grocery cart cooler which is not anticipated, rendered obvious, suggested, or even implied by any of the prior art storage devices, either alone or in any combination thereof.

To attain this, the present invention generally comprises a cooler for retaining food items in a refrigerated condition within a grocery cart. The inventive device includes an insulated container positionable within the upper basket of a grocery cart. A mounting assembly coupled to the container secures the container to both the handlebar of the grocery cart and a portion of the upper basket thereof. Freezable gel packs are positioned within the container and cooperate to retain foods positioned therein in a refrigerated condition.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new insulated grocery cart cooler apparatus and method which has many of the advantages of the storage devices mentioned heretofore and many novel features that result in a insulated grocery cart cooler which is not anticipated, rendered obvious, suggested, or even implied by any of the prior art storage devices, either alone or in any combination thereof.

It is another object of the present invention to provide a new insulated grocery cart cooler which may be easily and efficiently manufactured and marketed.

It is a further object of the present invention to provide a new insulated grocery cart cooler which is of a durable and reliable construction.

An even further object of the present invention is to provide a new insulated grocery cart cooler which is susceptible of a low cost of manufacture with regard to both materials and labor, and which accordingly is then susceptible of low prices of sale to the consuming public, thereby making such insulated grocery cart coolers economically available to the buying public.

Still yet another object of the present invention is to provide a new insulated grocery cart cooler which provides in the apparatuses and methods of the prior art some of the advantages thereof, while simultaneously overcoming some of the disadvantages normally associated therewith.

Still another object of the present invention is to provide a new insulated grocery cart cooler for retaining food items in a refrigerated condition within a grocery cart.

Yet another object of the present invention is to provide a new insulated grocery cart cooler which includes an insulated container positionable within the upper basket of a grocery cart, a mounting assembly coupled to the container for securing the container to both the handlebar of the grocery cart and a portion of the upper basket thereof, and freezable gel packs positioned within the container which cooperate to retain the foods positioned therein in a refrigerated condition.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded isometric illustration of the present invention.

FIG. 4 is a rear elevation view of the invention.

DESCRIPTION OF THE PREFERRED EMBODIMENT

Figure 1:
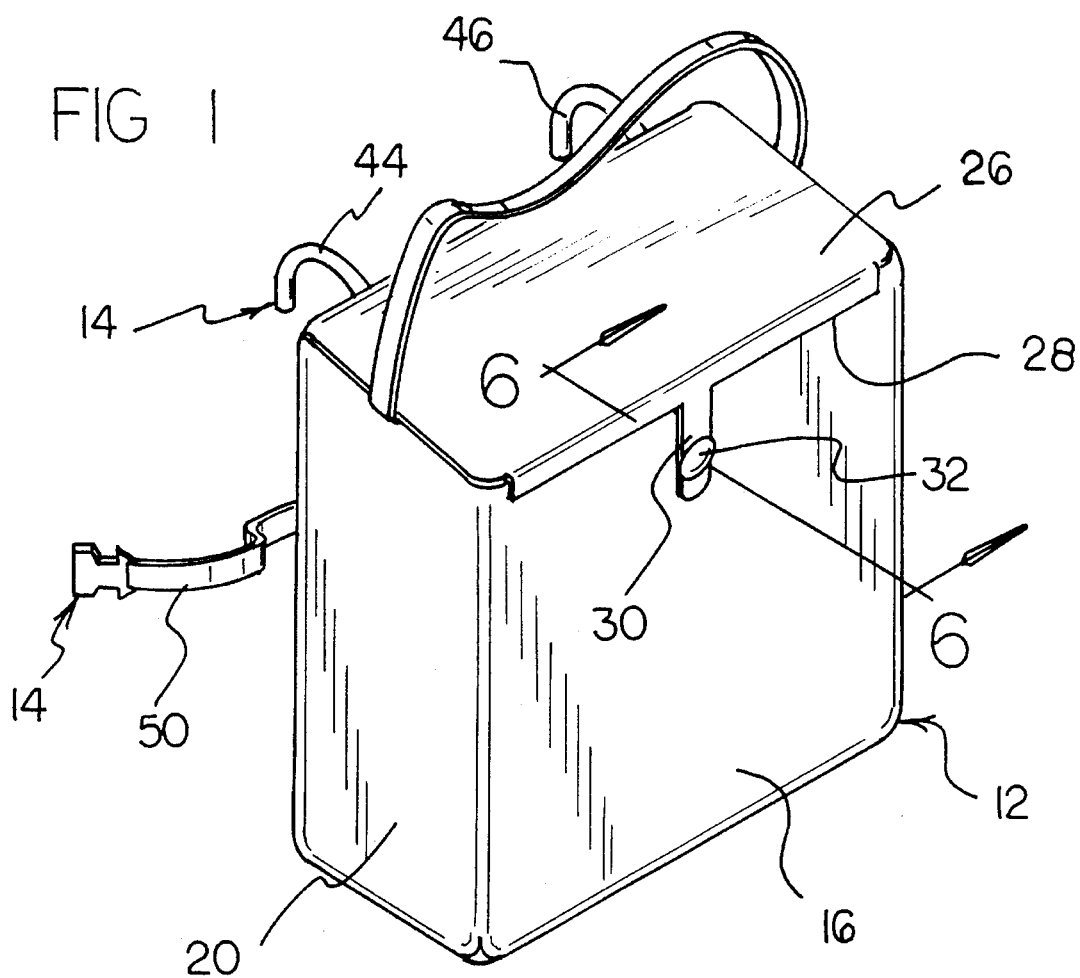
FIG. 1 is an isometric illustration of an insulated grocery cart cooler according to the present invention.

With reference now to the drawings, and in particular to FIGS. 1–6 thereof, a new insulated grocery cart cooler embodying the principles and concepts of the present invention and generally designated by the reference numeral 10 will be described.

More specifically, it will be noted that the insulated grocery cart cooler 10 comprises an insulated container means 12 for receiving and refrigerating a food item. A mounting means 14 is secured to the insulated container means 12 for coupling the insulated container means to a handlebar and a portion of an upper basket of a grocery cart.

As best illustrated in FIGS. 1 through 4, it can be shown that the insulated container means 12 according to the present invention 10 preferably comprises a flexible container including a front web 16 spaced from and parallel to a rear web 18 (see FIG. 4), with a first lateral web 20 and a second lateral web 22 extending substantially orthogonally between opposed vertical edges of the front and rear webs 16, 18. A bottom web 24 extends substantially orthogonally between lower horizontal edges of both the front and rear webs 16, 18 and the lateral webs 20 and 22 to complete the substantially rectangular shape of the flexible container of the insulated container means 12. A top web 26 is integrally or otherwise coupled along a longitudinal edge thereof to an upper edge of the rear web 18 and can be pivotally positioned into the closed configuration illustrated in FIGS. 1 and 2. The top web 26 includes a depending sealing flange 28 which extends into abutting engagement with a portion of the front web 16. A depending tab 30 is integrally or otherwise coupled to the sealing flange 28 of the top web 26 and extends downwardly therefrom along the front web 16. A latch means 32 is coupled to the depending tab 30 for securing the depending tab to a portion of the front web 16 in a manner which will be subsequently described in more detail.

Figure 5:
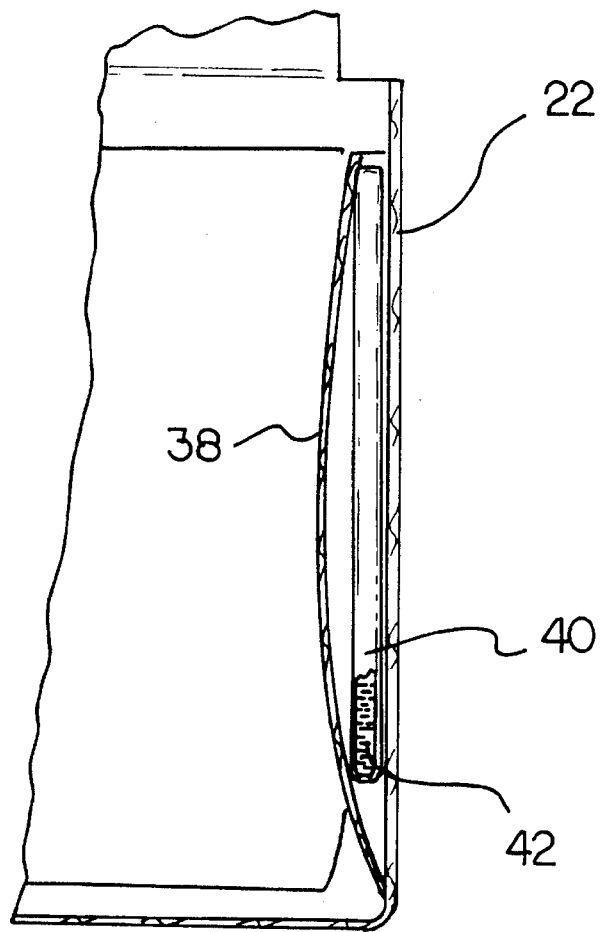
FIG. 5 is a cross sectional view taken along line 5—5 of FIG. 3.

As best illustrated in FIGS. 3 and 5, it can be shown that the insulated container means 12 according to the present invention 10 additionally comprises a rear pocket web 34 coupled to an interior surface of the rear web 18, with a first lateral pocket web 36 and a second lateral pocket web 38 being coupled to interior surfaces of the first lateral web 20 and the second lateral web 22, respectively. The pocket webs 34–38 are each operable to receive a gel pack 40 of flexible construction containing a freezable gel 42. By this structure, freezing of the gel packs 40 and subsequent placement thereof into the pockets defined by the pocket webs 34–38 will impart a cooling effect to the interior of the flexible container of the insulated container means 12, whereby foods and the like positioned therein will be maintained in a refrigerated condition.

Figure 2:
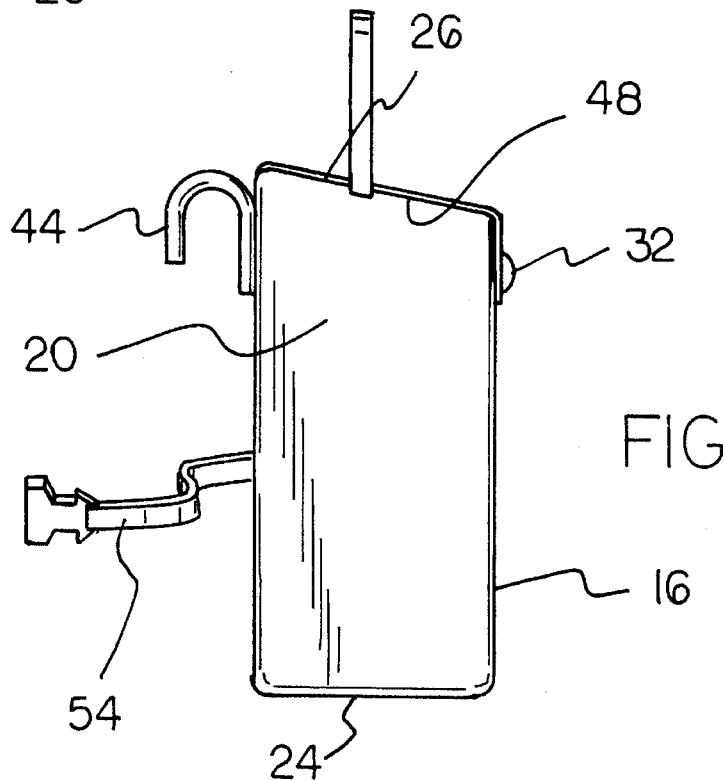
FIG. 2 is a side elevation view thereof.

As best illustrated in FIGS. 1, 2 and 4, it can be shown that the mounting means 14 according to the present invention 10 preferably comprises a first hook 44 coupled to an upper portion of the rear web 18 proximal to a juncture of the top web 26 and the upper edge of the rear web. Similarly, a second hook 46 is positioned in a substantially spaced and parallel orientation relative to the first hook 44 and is secured to the rear web 18 proximal to the junction between the top web 26 and the upper edge of the rear web. The hooks 44 and 46 are positioned and configured so as to engage a straight elongated handlebar of an unillustrated shopping cart to support the insulated container means 12 within an upper basket of the cart. Because a rearwardmost wall of the upper basket of the unillustrated cart is typically inclined at an oblique angle relative to a vertical plane, the insulated container means 12 will be supported therewithin at a slight angle relative to the horizontal. Thus, it is desirable for the lateral webs 20 and 22 to each include an angled upper edge 48 which will thus extend into a substantially horizontal orientation relative to a horizontal plane directed orthogonally through the vertical plane.

With continuing reference to FIGS. 1 through 4, it can be shown that the mounting means 14 further comprises a securing strap 50 coupled to the rear web 18 proximal to a center portion thereof. As shown in FIG. 4, the securing strap 50 includes a center portion 52 secured to the rear web 18 by stitching or the like. The securing strap 50 extends laterally beyond the flexible container of the insulated container means 12 to define a first lateral portion 54 extending beyond the first lateral web 20, and a second lateral portion 56 extending beyond the second lateral web 22. A male coupler 58 coupled to a distal end of the second lateral portion 56 of the securing strap 50 can be selectively engaged to a female coupler 60 secured to a free distal end of the first lateral portion 54 of the securing strap. By this structure, the lateral portions 54 and 56 of the securing strap 50 can be extended through apertures in the upper basket of the grocery cart, with the male coupler 58 being selectively securable to the female coupler 60 to thus secure the securing strap 50 and the attached insulated container means 12 relative to the grocery cart.

Figure 6:
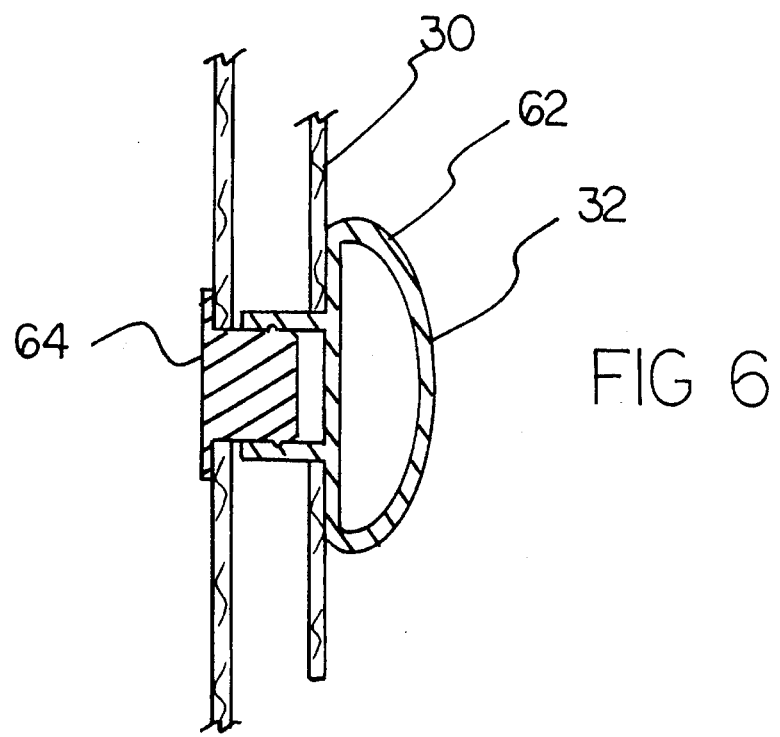
FIG. 6 is a cross sectional view taken along line 6—6 of FIG. 1.

FIG. 6 illustrates the specific latch means 32 illustrated for coupling the depending tab 30 to the front web 16 of the insulated container means 12. As shown, the latch means 32 comprises a female snap 62 coupled to the depending tab 30 which engages a male snap 64 coupled to and extending from the front web 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A insulated grocery cart cooler comprising:

an insulated container means comprises a flexible container including a front web spaced from and parallel to a rear web, with a first lateral web spaced from and parallel to a rear web, with a first lateral web and a second lateral web extending substantially orthogonally between opposed vertical edges of the front and rear webs, a bottom web extending substantially orthogonally between lower horizontal edges of the front and rear webs and the lateral webs; a top web pivotally coupled along a longitudinal edge thereof to an upper edge of the rear web; a rear pocket web coupled to an interior surface of the rear web, with a first lateral pocket web and a second lateral pocket web being coupled to interior surfaces of the first lateral web and the second lateral web, respectively; and a plurality of gel packs of flexible construction and containing a freezable gel, each of the gel packs being position within a individual pocket defined by the pocket webs so as to impart a cooling effect to an interior of the flexible container of the insulated container means;

a mounting means comprises a first hook coupled to an upper portion of the rear web proximal to a juncture of the top web and the upper edge of the rear web; and a second hook positioned in a substantially spaced and parallel orientation relative to the first hook and secured to the rear web proximal to the junction between the top web and the upper proximal to the junction between the top web and the upper edge of the rear web, the hooks being operable to engage a straight elongated handlebar of a shopping cart to support the insulated container means within an upper basket of the cart.

2. The insulated grocery cart cooler of claim 1, wherein the mounting means further comprises a securing strap coupled to the rear web, the securing strap including a center portion secured to the rear web, and extending laterally beyond the flexible container of the insulated container means to define a first lateral portion extending beyond the first lateral web, and a second lateral portion extending beyond the second lateral web; a male coupler coupled to a distal end of the second lateral portion of the securing strap; and a female coupler secured to a distal end of the first lateral portion of the securing strap, wherein the lateral portions of the securing strap can be extended through apertures in an upper basket of a grocery cart, with the male coupler being selectively securable to the female coupler to secure the securing strap and the attached insulated container means relative to the grocery cart.

3. The insulated grocery cart cooler of claim 2, wherein the lateral webs each include an angled upper edge which will extend into a substantially horizontal orientation relative to a horizontal plane directed orthogonally through the vertical plane when the cooler is positioned within an inclined upper basket of a grocery cart.

4. The insulated grocery cart cooler of claim 3, wherein the top web includes a depending sealing flange which extends into abutting engagement with a portion of the front web; a depending tab coupled to the sealing flange of the top web and extending downwardly therefrom along the front web; and a latch means coupled to the depending tab for securing the depending tab to a portion of the front web.

5. The insulated grocery cart cooler of claim 4, wherein the latch means comprises a female snap coupled to the depending tab; and a male snap coupled to and extending from the front web.

* * * * *